(12) United States Patent
Ohta et al.

(10) Patent No.: US 7,693,835 B2
(45) Date of Patent: Apr. 6, 2010

(54) CLIENT APPARATUS, DEVICE VERIFICATION APPARATUS, AND VERIFICATION METHOD

(75) Inventors: Ken Ohta, Yokohama (JP); Hiroshi Inamura, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 273 days.

(21) Appl. No.: 11/346,290

(22) Filed: Feb. 3, 2006

(65) Prior Publication Data

US 2006/0190987 A1  Aug. 24, 2006

(30) Foreign Application Priority Data

Feb. 4, 2005 (JP) ............................ P2005-029758
Jan. 27, 2006 (JP) ............................ P2006-019524

(51) Int. Cl.
    *G06F 17/30* (2006.01)
(52) U.S. Cl. ............................................. 707/6; 707/10
(58) Field of Classification Search .................... 707/6, 707/10; 713/200; 399/27
See application file for complete search history.

(56) References Cited

U.S. PATENT DOCUMENTS

| | | | |
|---|---|---|---|
| 6,202,157 B1 | 3/2001 | Brownlie et al. | |
| 6,353,886 B1 | 3/2002 | Howard et al. | |
| 6,658,571 B1 | 12/2003 | O'Brien et al. | |
| 6,873,802 B2 * | 3/2005 | Koga et al. ..................... | 399/27 |
| 2003/0131245 A1 | 7/2003 | Linderman | |
| 2005/0028003 A1 | 2/2005 | Wray | |
| 2005/0131997 A1 | 6/2005 | Lewis et al. | |
| 2005/0138404 A1 * | 6/2005 | Weik et al. .................... | 713/193 |
| 2005/0144475 A1 * | 6/2005 | Sakaki et al. ................ | 713/200 |
| 2005/0267954 A1 | 12/2005 | Lewis et al. | |

FOREIGN PATENT DOCUMENTS

| | | |
|---|---|---|
| CN | 1321040 A | 11/2001 |
| JP | 2003-76585 | 3/2003 |

OTHER PUBLICATIONS

IEEE, no matched results, Nov. 12, 2009, p. 1.*
Constructing collaborative desktop storage caches for large scientific datasets, Sudharshan Vazhkudai, Xiaosong Ma, Vencent Freeh, Jonathan Strickland, Nandan Tammineedi, ACM, Aug. 2006, pp. 1-34.*
GLP client and server, google.com, Nov. 12, 2009, pp. 1-5.*
Patent Abstracts of Japan, JP 2003-076585, Mar. 14, 2003.

* cited by examiner

*Primary Examiner*—Yicun Wu
*Assistant Examiner*—Donald Lawson
(74) *Attorney, Agent, or Firm*—Oblon, Spivak, McClelland, Maier & Neustadt, L.L.P.

(57) ABSTRACT

A client apparatus for utilizing services by executing service programs includes a policy holding unit, a verification unit, a verification result holding unit, and a verification result notification unit. The policy holding unit holds a service-specific verification policy pre-checked by a device verification apparatus. The verification unit verifies an operation and configuration of the client apparatus itself by using the verification policy when the service program is executed. The verification result notification unit notifies the verification result to the device verification apparatus, which requests the verification result.

12 Claims, 9 Drawing Sheets

```
#Monitoring Policy for Mail Service
def pre_MailSend(req,res)
 if rate_monitor()>100
 api_lock(MailSend.true)
 if rate_monitor()>50
  accounting(70)
```

FIG.2B

```
#Monitoring Policy for Banking Service
def pre_BankingAccess(req,res)
 if running_untrusted_app()==true
  api_lock(BankingAccess.true)
  logging(abcbank.com)
```

CLIENT APPARATUS, DEVICE VERIFICATION APPARATUS, AND VERIFICATION METHOD

CROSS REFERENCE TO RELATED APPLICATIONS

This application is based upon and claims the benefit of prior Japanese Patent Application P2005-29758 filed on Feb. 4, 2005 and Japanese Patent Application P2006-19524 filed on Jan. 27, 2006; the entire contents of which are incorporated by reference herein.

BACKGROUND OF THE INVENTION

1. Field of the Invention

The present invention relates to a client apparatus, and an apparatus and a verification method for verifying a device.

2. Description of the Related Art

It is necessary to verify security of a client apparatus when information communication services are provided to the client apparatus such as a cellular phone, PDA, or a PC.

For example, there has been disclosed a technology which allows a device verification apparatus to investigate security or trustworthiness by utilizing a trusted module in a client apparatus, and a service provider to decide permission of service provisioning based on the investigation result (for example, see Japanese Patent Laid-Open Publication No. 2003-76585). According to this technology, the investigation result contains a list of hash values of a software group disposed in the client apparatus, and digitally signed by the trusted module. The service provider holds the list of valid hash values of the software group in the client apparatus, and compares each hash value with the valid hash value after verification of the signature of the investigation result to check presence of alteration. The service provider can reject service provision to the client apparatus when it detects alteration of certain software or when a hash value of software other than a valid software group is contained. Hence, the service provider can provide services upon verification of the security of the client apparatus.

However, the aforementioned conventional technology doesn't have means for applying a service-specific verification policy to each service and means for deciding permission of provisioning of each service according to the verification result. Thus, it is hard to decide permission of service provision based on verification of operation (behavior) and configuration of the client apparatus because service providers can have service-specific requirements for operation and configuration of client apparatus. Besides, the conventional technology may cause users serious inconvenience because access to all service are prohibited, when abnormality is detected by the verification.

Additionally, the aforementioned conventional technology doesn't have means for checking the security of a verification policy itself. Thus, it is possibility to lose security of the client apparatus and privacy of user by introducing malicious or defective verification policy to the client apparatus.

The present invention has been developed with the foregoing problems in mind, and objects of the invention are to provide a client apparatus, a device verification apparatus and verification method, which guarantee that the client apparatus satisfies the policy of the each service and protect security and privacy of the client apparatus by verification of security of policy itself.

SUMMARY OF THE INVENTION

A first aspect of the present invention is to provide a client apparatus for utilizing services by executing a provided service program, the client apparatus, including: (A) a policy holding unit configured to hold a service-specific verification policy pre-checked by a device verification apparatus. (B) a verification unit configured to verify an operation of the client apparatus itself when the service program is executed by using the verification policy; (C) a verification result holding unit configured to hold a verification result of the verification unit; and (D) a verification result notification unit configured to notify the verification result to the device verification apparatus which requests the verification result.

A second aspect of the present invention is to provide a device verification apparatus comprising: (A) a policy holding unit configured to hold a verification policy corresponding to a service program; (B) a policy verification unit configured to check security of the verification policy; (C) a policy deployment unit configured to deploy the verification policy pre-checked by the policy verification unit according to a request of a client apparatus which executes the service program; and (D) a verification result holding unit configured to hold a verification result obtained from the client apparatus which verifies its own operation when the service program is executed by using the verification policy.

A third aspect of the present invention is to provide a verification method for verifying a client apparatus utilizing services by executing a provided service program, the verification method, comprising: (A) checking security of the verification policy corresponding to the service program; (B) deploying the verification policy, which is pre-checked by the checking step, in a client apparatus which executes the service program; (C) verifying an operation of the client apparatus itself when the service program is executed by using the verification policy; and (D) notifying the verification result to a device verification apparatus which requests the verification result.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

A first embodiment is directed to a case where after checking of security of a verification policy of each service provider, a device verification apparatus provides the verification policy to a trusted verification module in a client apparatus, and decides permission of service provision according to a verification result notified by the trusted verification module.

(Verification System)

Figure 1:
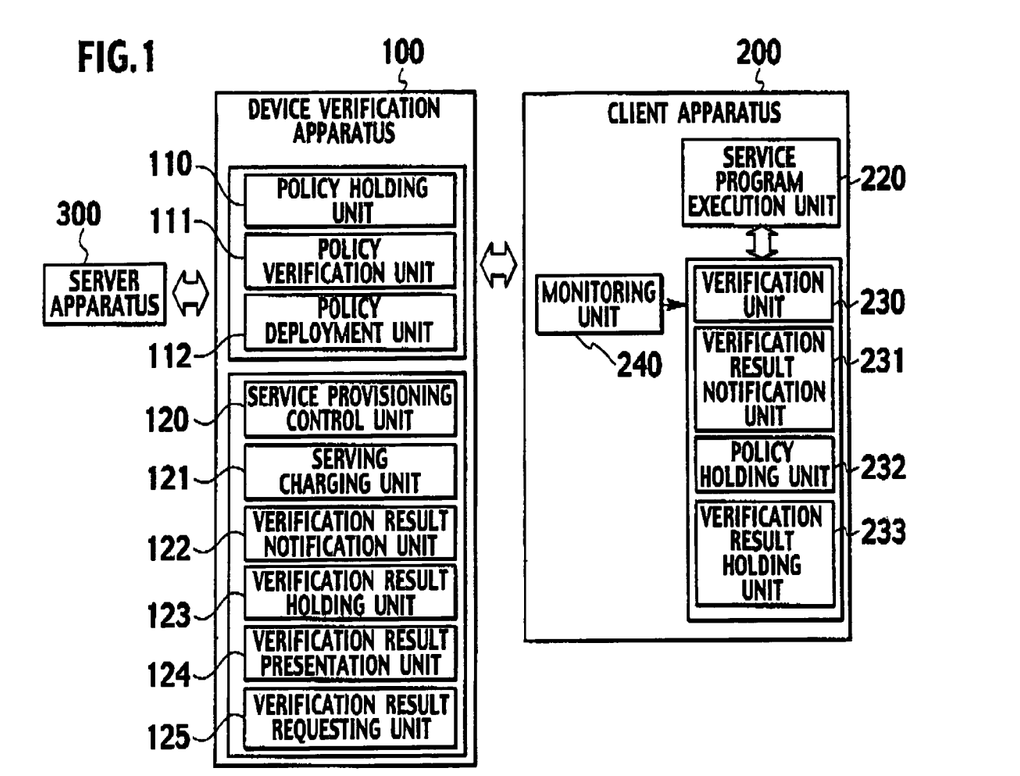
FIG. 1 is a block diagram showing a configuration of a verification system according to a first embodiment.

As shown in FIG. 1, a verification system of the first embodiment includes a device verification apparatus 100, a client apparatus 200, and a server apparatus 300.

In FIG. 1, one client apparatus 200 and one device verification apparatus 100 are shown. According to the first embodiment, however, one device verification apparatus 100 is connected to a plurality of client apparatus 200. The client apparatus 200 and the device verification apparatus 100 are connected to each other through a network. A connection form thereof may be by wire or radio, and any system such as a packet, line switching, or serial/parallel communication can be employed.

The device verification apparatus 100 and the client apparatus 200 are connected to the server apparatus 300 which provides services to the client apparatus 200 through a certain type of connections. The server apparatus 300 is a server operated by a service provider to provide information communication services such as digital contents, a database, on-line shopping, on-line game and banking. For example, the information communication services include VPN (Virtual Private Network) services for providing access to a corporate intranet, mail service and wireless LAN service.

The client apparatus 200 includes a service program execution unit 220, a verification unit 230, a verification result notification unit 231, a policy holding unit 232, and a verification result holding unit 233.

The service program execution unit 220 executes a service program to utilize services of the service provider, and may simultaneously execute a plurality of service programs. The service program is client software such as a VPN client, a mail reader, a viewer, a player or a browser of contents or a database.

The policy holding unit 232 holds a service-specific verification policy pre-checked by the device verification apparatus 100 described below. A list of service programs installed in the client apparatus 200 is transmitted to the device verification apparatus 100 to request a necessary verification policy. The verification policy is presumed to be directly obtained from the device verification apparatus 100 through communication. However, it may be obtained by using a storage medium such as a memory card. It may be obtained together with the service program from the server of the service provider. The policy holding unit 232 may check security of the verification policy. For example, to check the security of the verification policy, it tests a digital signature of the verification, or it checks whether the policy tries to perform unauthorized or unnecessary access to privacy or critical information in client apparatus. The verification policy may take the form of rules or program codes. The policy holding unit 232 rejects and discards the verification policy when the policy is judged to be unsecured.

The verification unit 230 verifies an operation state or a configuration of the client apparatus 200 itself, when the service program is executed, by using a verification policy corresponding to the service program. The verification unit 230 may verify the client apparatus upon reception of a notification from the outside. When a plurality of service programs is operated, each corresponding verification policy is investigated. The verification policy may contain a command of calling a function of the client apparatus 200, and the verification unit 230 may perform function calls according to a result of the verification. As an example of the function of the client apparatus 200, there is a charging function or an access control function. For example, a verification policy specifies charging function should be called when the result of the verification satisfies a certain condition. Another example is blocking application programming interface (API) when the result of the verification satisfies a certain condition. The verification unit 230 must have tampering resistance against attacks including disturbing verification processing and alteration of a verification result by software of an external device or the client apparatus. Accordingly, for example, the verification unit 230 can be mounted by using a smart card (IC card) or a trusted platform module (TPM) whose specification is defined by Trusted Computing Group (www.trustedcomputing). Alternatively, a mechanism of a virtual machine monitor (VMM) may be introduced to the client apparatus 200 to accommodate multiple virtual machines on the client apparatus. Thus a virtual machine running the trusted verification unit can be isolated from another virtual machine which executes the service program.

Figure 2A:
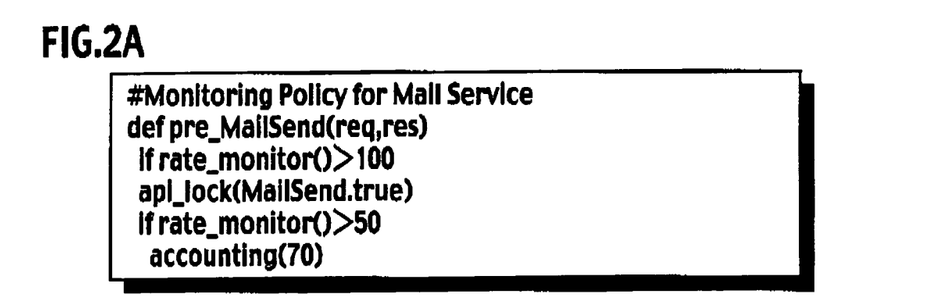
FIGS. 2A and 2B are diagrams showing examples of a verification policy according to the first embodiment.
Figure 2B:
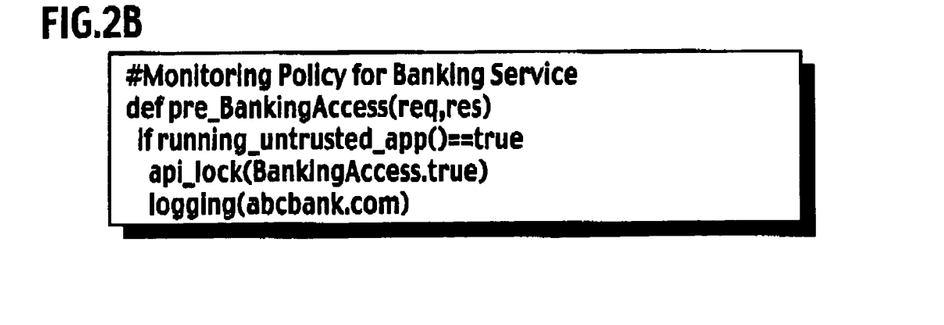

The verification policy is obtained from the device verification apparatus 100 or the server apparatus 300. The verification policy has verification rules unique to the service program, and enables verification of 1. Operation, 2. Presence of untrusted or unnecessary application programs running in the client apparatus, and 3. Presence of untrusted modules such as device drivers running in the client apparatus. In addition, integrity of system/application files, timestamp of an anti-virus pattern files, status of a specific port of a firewall, or the like may be tested. The verification policy may call functions including charging, logging and so on. As examples of verification policies, a verification policy for a service program of mail services and a verification policy for banking services are each shown in FIGS. 2A and 2B. In the example of the mail services, a rule is set to block access to a mail transmission service (correspond to an api_rock function in line 4) or execute special charging (correspond to an accounting function in line 6) according to an amount of transmitted mails when frequent mail transmissions are detected (correspond to a rate_monitor function in line 3 and line 5). In the case of the banking service, a rule is set to block the banking program accessing the banking server and transmit a log (correspond to lines 4-5) when detecting untrusted programs running in the client apparatus (correspond to line 3). An example of untrusted programs refers to programs without digital signature by a trusted party As shown in FIG. 2, the verification policy may be in a form of a rule or a program code. In the case of the form of the rule, the verification unit 230 interprets the rule to perform verification. In the case of the form of the program code, the verification unit 230 executes a program of its verification policy.

The verification result holding unit 233 gets and holds a verification result (verification log) from the verification unit 230. The verification result may include a frequency of mail transmission, the number of times and/or time of locking mail transmission in the case of the mail service of FIG. 2. As for the banking service, events of blocking a banking service or a type of untrusted application may be included in the result. Additionally, a name or a type of a connected network, a type of a connected add-on device may be contained in the verification result. The verification result held in the verification result holding unit 233 may be deleted when it is notified by the verification result notification unit 231 described below.

The verification result notification unit 231 notifies the verification result to the external device which requests it. The verification result notification unit 231 may notify the verification result in response to a request from the device verification apparatus 100 or to the device verification apparatus 100 at the timing designated by a verification policy. Examples of external devices are the device verification apparatus 100, the server apparatus 300, and the like. When the verification result is notified, to prevent alteration of the verification result or pretension as the verification unit 230, the verification unit 230 may digitally sign or encrypt the verification result.

The monitoring unit 240 may monitor an operation and configuration information of the client apparatus 200, and notifies monitoring information to the verification unit 230. For example, it monitors a start/end of the service program, an active (foreground) or inactive (sleep mode or background) state of the service program, a type or a state (connection or disconnection) of a connected network, a type or a state of a add-on device, a state of integrity of a file, and the like. A state change, a periodic timer, abnormality detection, or the like may trigger off the notification of the monitoring information to the verification unit. It should be noted that an internal storage device such as an RAM or an external storage device such as a hard disk or a flexible disk may be used for the policy holding unit 232 and the verification result holding unit 233.

The client apparatus 200 of the first embodiment may be configured by incorporating the service program execution unit 220, the verification unit 230, the verification result notification unit 231, and the like as modules in a CPU. These modules can be realized by executing a program special for using a predetermined programming language in a general-purpose computer such as a personal computer.

The client apparatus 200 may include a program holding unit (not shown) for storing a program to cause the CPU to execute service program execution processing, verification processing, verification result notification processing or the like. For example, the program holding unit is a recording medium such as an RAM, an ROM, a hard disk, a flexible disk, a compact disk, an IC chip, or a cassette tape. According to such a recording medium, the program can be easily stored, transported, or sold.

The device verification apparatus 100 includes a policy holding unit 110, a policy verification unit 111, a policy deployment unit 112, a service provisioning control unit 120, a service charging unit 121, a verification result notification unit 122, a verification result holding unit 123, a verification result presentation unit 124, and a verification result requesting unit 125.

The policy holding unit 110 holds a verification policy corresponding to a service program. This verification policy is obtained from the server apparatus 300, which provides the service program. For example, it is provided by a service provider, a service program developer, a network operator, or the like.

The policy verification unit 111 checks security of the verification policy. For example, to protect user resources or privacy information in the client apparatus 200, the policy verification unit 111 interprets or investigates whether the verification policy performs unauthorized or unnecessary access. When the verification policy is judged to be unsafe, the policy verification unit 111 rejects deployment of the policy in the client apparatus.

The policy deployment unit 112 deploys a verification policy whose security is confirmed by the policy verification unit 111 in the trusted verification unit 230 of the client apparatus 200, which executes the service program. Specifically, the policy deployment unit 112 establishes a secure channel with the verification unit 230, and then sends the verification policy. To prevent alteration of the verification policy or pretension as a verification apparatus, the verification policy may be digitally signed or encrypted.

The policy deployment unit 112 may deploy the verification policy in the client apparatus 200 designated by the server device 300 which provides the service program or in the client apparatus 200 which accesses the server apparatus 300.

The verification result holding unit 123 obtains a verification result from the client apparatus 200 to hold it. For example, the verification result (verification log) can contain timestamp and event information.

The verification result held in the verification result holding unit 123 may be deleted after a passage of predetermined time.

The service provisioning control unit 120 decides permission of access of the client apparatus 200 to the server apparatus 300 based on the verification result. For example, when the client apparatus 200 operates to violate the verification policy, the service provisioning control unit 120 rejects access from the client apparatus 200 to the server apparatus 300 or redirects access to a particular apparatus like recovery servers and quarantine servers). In FIG. 2, when the client apparatus transmits a lot of e-mails, or launches untrustworthy programs, access to the servers is rejected. Access can be blocked by any means. For example, 1. the device verification apparatus 100 itself receives an access request from the client apparatus and passes a permitted access request to the server apparatus, 2. an access control unit on a path from the client apparatus 200 to the server apparatus 300 blocks requests when receiving a blocking request from the device verification apparatus 100. Moreover, the device verification apparatus 100 can validate or invalidate access certificates or access tickets for the client apparatus to perform access control.

The verification result requesting unit 125 requests a verification request to the client apparatus 200. The request of the verification result may require that the client apparatus 200 should execute verification upon receiving the request of the verification result and return the result. Otherwise, it may require that the client apparatus 200 should just return a cached verification result in the client apparatus. A filtering request of the verification result may be included. Further, the verification result requesting unit 125 may receive a request from the external device to request a verification report from the client apparatus 200. For example, the external device is the server apparatus 300 or the access control unit. It can request verification report from the client apparatus at arbitrary timing.

The service charging unit 121 charges usage of the service program by the client apparatus 200 based on the verification result. For example, charging may be carried out according to the number of times of viewing/listening or playing (pay per view or pay per play), or according to service usage time.

Alternatively, charged information may be notified to the server apparatus 300 to settle money payment, collection of fees, or the like.

The verification result notification unit 122 notifies the verification result to the service apparatus 300. The verification result notification unit 122 may notify verification results of a plurality of client apparatus en bloc, or notify an encrypted or signed verification result.

The verification result presentation unit 124 presents the verification result to an output unit. The output unit is a screen of a monitor or the like, and a liquid crystal display (LCD), alight emitting diode (LED) panel, an electroluminescence (EL) panel, or the like can be used. The output unit may be a printer.

For each of the policy holding unit 110 and the verification result holding unit 123, an internal storage device such as an RAM may be used, or an external storage device such as a hard disk or a flexible disk may be used.

The device verification apparatus 100 of the first embodiment may be configured by incorporating the policy verification unit 111, the policy deployment unit 112, the service provisioning control unit 120, the service charging unit 121, the verification result notification unit 122, and the like as modules in a CPU. These modules can be realized by executing a program special for using a predetermined programming language in a general-purpose computer such as a personal computer.

The device verification apparatus 100 may include a program holding unit (not shown) for storing a program to cause the CPU to execute policy verification processing, policy deployment processing, service provisioning control processing, service charging processing, verification result notification processing, or the like. For example, the program holding unit is a recording medium such as an RAM, an ROM, a hard disk, a flexible disk, a compact disk, an IC chip, or a cassette tape. According to such a recording medium, the program can be easily stored, transported, or sold.

(Verification Method)

Next, referring to FIGS. 3 to 6, a verification method according to the first embodiment will be described.

Figure 3:
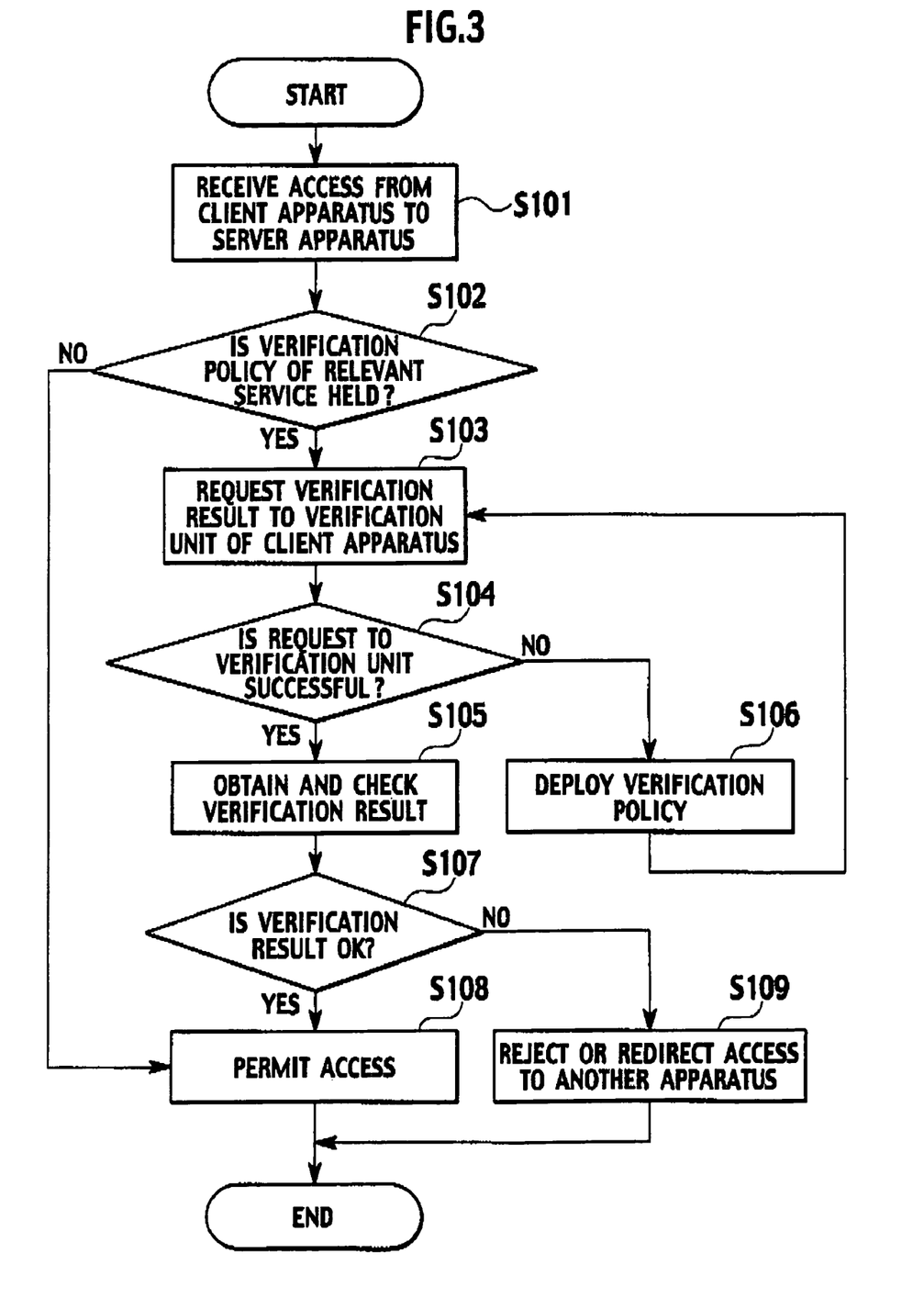
FIG. 3 is a flowchart showing a verification method (1) according to the first embodiment.

First, referring to FIG. 3, a method for deciding permission of service provisioning when the device verification apparatus 100 receives access from the client apparatus to the server apparatus 300.

First, in step S101, upon reception of access from the client apparatus 200 to the server apparatus 300, the policy holding unit 110 checks that it holds a verification policy corresponding to the service program. If it holds the policy the process proceeds to step S108 where judges that the service does not need any verification and access to the service is permitted.

If it holds the verification policy, the process proceeds to step S103 where the verification result notification unit 122 requests a notification of a verification result from the verification unit 230 of the client apparatus 200.

At this time, if the request of the notification of the verification request fails in step S104, the verification result notification unit 122 judges that deployment of the verification policy in the client apparatus 200 has failed. Then the policy deployment unit 112 deploys the verification policy in step S106 The verification request may fail, when a reply from the client apparatus is not returned within certain time limit (time-out), is broken, or is outdated with an old verification policy version. On the other hand, if a response of the verification result is successfully obtained, in step S105, a digital signature of the verification result is checked, and the verification result is interpreted.

Next, if there is no violation of verification rules in the verification result in step S107, the process proceeds to step S108 to permit access to the server apparatus 300. In this case, the service may be charged. This permission deciding procedure may be applied to access control for Internet access by VPN or the like in addition to the access to the server apparatus 300.

On the other hand, if the access to the service is rejected with the verification result, for example, if a lot of e-mails are transferred or an untrustworthy application is starting up, referring to the verification policy of FIG. 2, the process proceeds to step S109 to reject the access to the server apparatus. Alternatively, the access is redirected to a particular apparatus such as recovery servers and quarantine servers.

As a first modified example, in step S101, if the verification policy corresponding to the service program is not held, the policy holding unit 110 may ask the server apparatus 300 about presence of a verification policy. The policy holding unit 110 obtains the verification policy from the server apparatus 300 if there is a verification policy, or judges that a service needs no verification to permit access if not.

The example where the device verification apparatus 100 itself receives the access request from the client apparatus 200 and passes the permitted access request alone to the server apparatus has been described with reference to the flowchart of FIG. 3. As a modified example, an access control unit that independently enforces access control may be deployed between the client apparatus and the server apparatus, and the access control unit may receive a request from the client apparatus. In this case, upon reception of the request from the client apparatus 200, the access control unit may query the device verification apparatus 100 about access control decision to pass or judge the client request.

As a second modified example, in step S103, the verification unit 230 may check the security of the client apparatus 200 according to the verification policy, and call an access control function of the client apparatus for restricting access to the service, or call a charging function of the client apparatus for charging.

Figure 4:
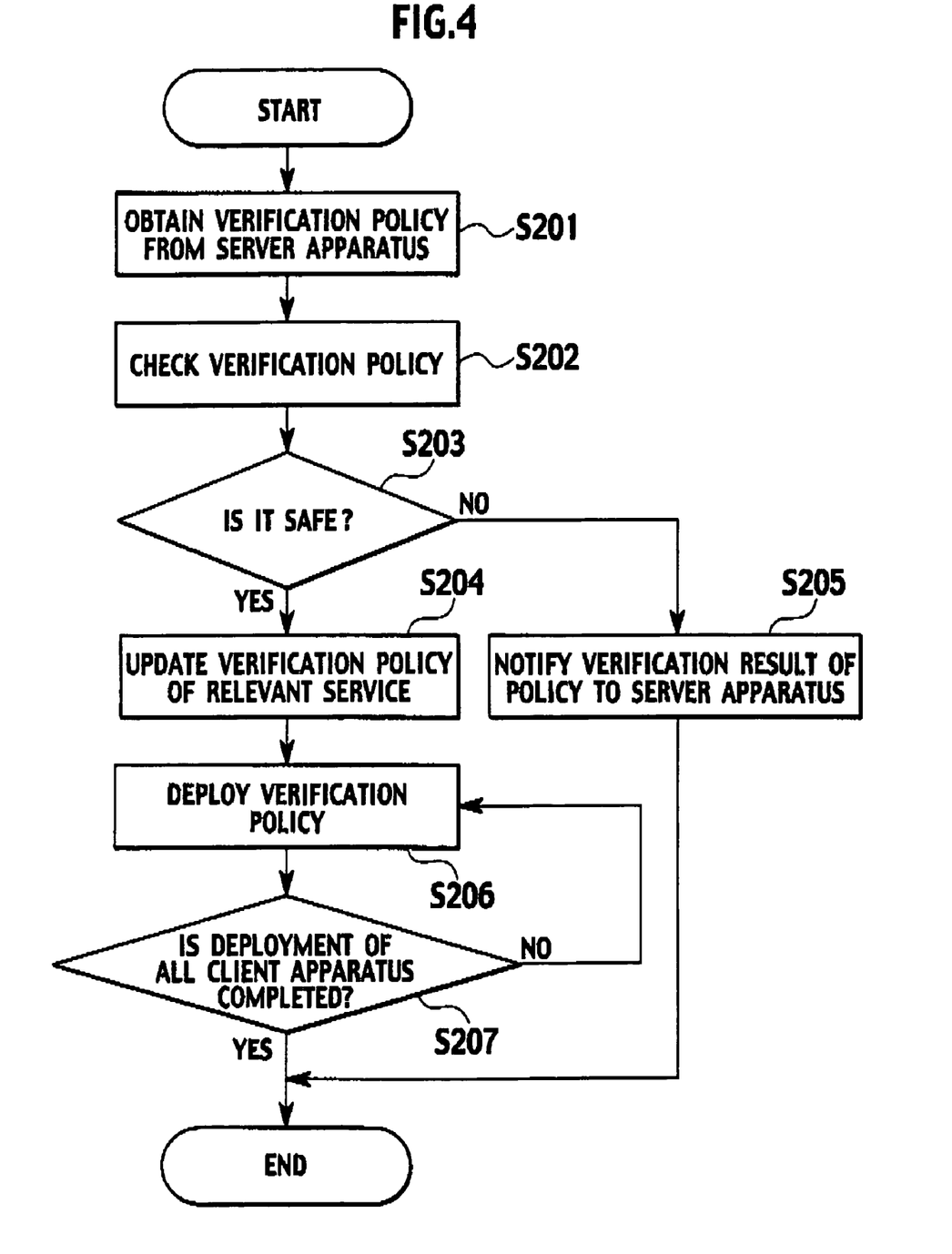
FIG. 4 is a flowchart showing a verification method (2) according to the first embodiment.

Next, referring to FIG. 4, a method for deploying verification policy in the client apparatus 200 when the device verification apparatus 100 obtains the verification policy from the server apparatus 300 will be described.

First, in step S201, the policy holding unit 110 obtains a verification policy from the server apparatus 300 to hold it. Then, in step S202, the policy verification unit 111 checks security of the verification policy.

If the policy verification unit 111 judges in step S203 that the verification policy is not safe, in step S205, it notifies rejection of the policy together with a policy verification result to the server apparatus 300. On the other hand, if it is judged that the verification policy is safe, in step S204, the policy holding unit 110 updates a verification policy corresponding to the service.

Then, in step S206, the policy deployment unit 112 deploys the verification policy in each target client apparatus 200. A list of target client apparatus 200 is provided from the server apparatus 300 or obtained by referring to a database for managing the list of client apparatus 200 of service users.

Subsequently, in step S207, the procedure is finished when verification policies are deployed in all the client apparatus. For a client apparatus 200 in which verification policy deployment has failed because of disconnection to the network, power-OFF or the like, deployment is tried again after a passage of certain time. The policy deployment unit 112 may set an upper limit on the number of retry times.

In the above explanation, the device verification apparatus 100 actively deploys the policy by connecting to the client apparatus 200. But as a modified example, the device verification apparatus 100 may deploy the policy according to a request from the policy holding unit 232 of the client apparatus 200. The request may include the list of service program on the client apparatus 200. The device verification apparatus 100 may deploy all necessary policies to the client apparatus 200 based on the list.

As another modified example, the verification unit 230 may update the policy at the case of the reply from the client apparatus is broken, time-out, or outdated, as mentioned in the step S104 of the FIG. 3.

Figure 5:
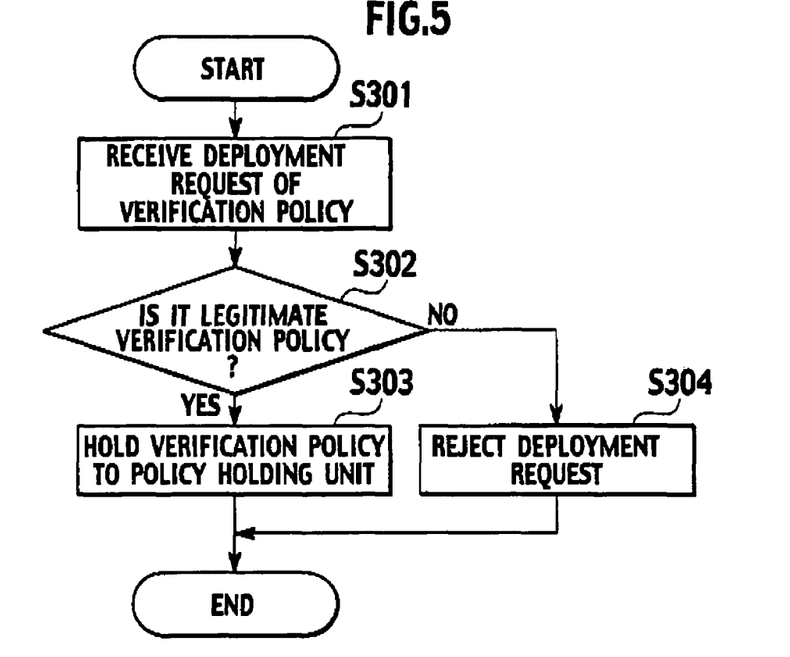
FIG. 5 is a flowchart showing a verification method (3) according to the first embodiment.

Next, referring to FIG. 5, a method of introducing a verification policy when the client apparatus 200 receives a verification policy deployment request from the device verification apparatus 100 will be described.

First, in step S301, a verification policy deployment request is received from the device verification unit 100. Next, in step S302, the policy holding unit 232 confirms whether the verification policy is legitimate and safe or not by checking a digital signature or scanning contents of the verification policy.

If the verification policy is legitimate and safe, in step S303, the policy holding unit 232 introduces or updates a verification policy. On the other hand, if the verification policy is not legitimate or safe, for example, the verification policy isn't from the legitimate device verification apparatus 100, the verification policy is altered, or contents of the verification policy include rules or codes infringing security or privacy of the client apparatus 200, in step S304, the policy holding unit 232 rejects the deployment request.

Figure 6:
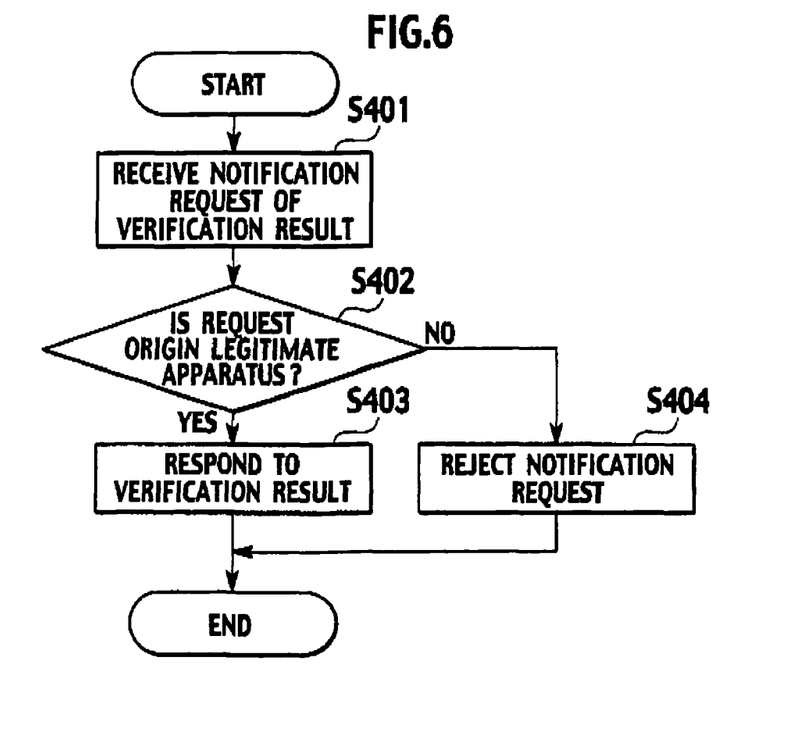
FIG. 6 is a flowchart showing a verification method (4) according to the first embodiment.

Next, referring to FIG. 6, a method of notifying a verification result when the client apparatus 200 receives a verification policy notification request from the device verification apparatus 100 will be described.

In step S401, the client apparatus 200 receives a verification policy notification request from the device verification apparatus 100. Then, in step S402, the verification unit 230 confirms whether the request is from a legitimate device verification apparatus 100 or not by checking a digital signature.

If the request is from the legitimate device verification apparatus, in step S403, the verification result notification unit 231 acquires a verification result from the verification result holding unit 233 and notifies the verification result to the device verification apparatus 100. In this case, the notified verification result may be deleted from the verification result holding unit 233. On the other hand, if the request is not from the legitimate apparatus, in step S404, the verification result notification unit 231 rejects the notification request.

As a modified example, the notification request of the verification policy may include the timeframe or update request on the verification result. The verification result notification unit 231 may interpret the notification request of the verification policy. And in the S403, if necessary, the verification result notification unit 231 may start up the verification unit 230 and let the verification unit 230 verify the operation and configuration of the client apparatus 200. After a new verification result is acquired, the verification result notification unit 231 may acquire the new verification result from the verification result holding unit 233, and notice the new verification result to the devise verification apparatus 100.

(Operations and Effects)

According to the client apparatus 200, the device verification apparatus 100, and the verification method of the first embodiment, the verification unit 230 of the client apparatus 200 can verify the client apparatus 200 according to the service-specific verification policy whose security is confirmed by the device verification apparatus 100. Thus, it is possible to inspect an operation or a set state of the client apparatus, security information, a version of installed software, and the like by utilizing a verification policy whereby a safer service provisioning environment can be provided. It is possible to guarantee that the client apparatus satisfies the policy of the each service. Security and privacy of the client apparatus can be protected by checking verification policy itself. Moreover, only affected services can be blocked to maintain user convenience when detecting the violation of verification policy.

The verification policies are managed in a concentrated manner by the device verification apparatus 100, and deployed in the client apparatus 200 after checking its safety. Thus, it is possible to maintain security of the client apparatus 200 and to reduce management or deployment loads of the server apparatus 300.

The policy holding unit 232 of the client apparatus 200 may hold a verification policy obtained only from a predetermined particular apparatus. When an optional apparatus can introduce a verification policy to the verification unit 230 of the client apparatus 200, it is possible to prevent damaging security or privacy of the client apparatus.

As the client apparatus 200 includes the verification result holding unit 233, verification results can be transmitted en bloc to the device verification apparatus 100. Even when a communication amount is reduced or the client apparatus 200 is temporarily out off from the network, the verification results can be transmitted to the device verification apparatus at the time of connection thereafter.

The verification result held in the verification result holding unit 233 of the client apparatus 200 may be deleted after its notification to the device verification apparatus 100. Thus, it is possible to prevent squeezing of a storage capacity or overflowing of verification logs caused by an increase in verification results (verification logs) held by the client apparatus 200.

The policy holding unit 232 of the client apparatus 200 may check security of the verification policy. Accordingly, it is possible to improve the security of the verification policy more.

The policy holding unit 232 of the client apparatus 200 may obtain a necessary policy from the device verification apparatus 100 to update it. Accordingly, the client apparatus 200 can always hold a proper policy.

The verification unit 230 of the client apparatus 200 may execute verification upon reception of a notification from the external device. Accordingly, the client apparatus 200 can execute verification based on a request from the external device.

The client apparatus 200 further includes the monitoring unit 240 for monitoring the operation and the configuration information of the client apparatus 200 to notify the monitoring information to the verification unit 230. Accordingly, the client apparatus 200 can always have the monitoring information.

The verification result notification unit 231 of the client apparatus 200 may notify the verification result to the device verification apparatus at the timing specified by the verification policy. Accordingly, the client apparatus 200 can notify the verification result at the suitable timing based on the verification policy.

The verification policy may contain a command of calling the function of the client apparatus, and the verification unit 230 may call the function according to the result of the verification. Thus, the client apparatus 200 can perform a suitable operation such as charging or locking functions, based on the verification result.

The device verification apparatus 100 of the first embodiment obtains the verification result based on the verification policy provided to the client apparatus 200, and decides permission of access to the server apparatus after its interpretation. Thus, the server apparatus 300 can provision services with trusting the client apparatus 200.

The policy verification unit 111 of the device verification apparatus 100 checks security of the verification policy. Thus, it is possible to protect security and privacy of the client apparatus.

The service provisioning control unit 120 of the device verification apparatus 100 decides permission of access from the client apparatus 200 to the server apparatus 300 based on the verification result. Thus, only the client apparatus 200 proved by the device verification apparatus can access the server apparatus 300.

The service charging unit 121 of the device verification apparatus 100 charges use of services based on the verification result. Thus, it is possible to execute flexible charging according to the number of viewing/listening or playing times, or time (paper view, paper play, or the like) based on the verification result of the client apparatus. It is also possible to reduce loads of charging or verification processing on the service provider.

The verification result held in the verification result holding unit 123 of the device verification apparatus 100 may be deleted after a passage of predetermined time. Thus, it is possible to prevent squeezing of the storage capacity or overflowing of verification logs caused by an increase in verification results (verification logs) of the device verification apparatus 100.

The verification result presentation unit 124 of the device verification apparatus 100 presents the verification result to the output unit. Thus, the operator of the device verification apparatus 100 can present a reason for charging services or stopping service provisioning to the user.

The verification policy held in the policy holding unit 110 of the device verification apparatus 100 may be obtained from the server apparatus 300. Thus, it is possible to check the service program according to a request from each service provider, whereby safer service provisioning and finer charging are enabled. Additionally, it is possible to deal with even a change of the verification policy of the service provider.

The policy deployment unit 112 of the device verification apparatus 100 deploys a verification policy in a client apparatus designated by the server apparatus 300 or a client apparatus which accesses the server apparatus 300. Thus, the server apparatus 300 can leave deployment of the verification policy to the device verification apparatus 100 to reduce its processing load and management cost. Additionally, it is possible to provision safe services by surely deploying the verification policy in the client apparatus 200 which accesses the server apparatus 300.

The verification result notification unit 122 of the device verification apparatus 100 notifies a verification result to the server apparatus 300. Hence, the service provider itself can execute flexible charging or selection of permission of service provisioning.

The policy holding unit 110 of the device verification apparatus 100 may obtain the verification policy from the server apparatus 300 to update it. Hence, the device verification apparatus 100 can always hold a proper policy.

The device verification apparatus 100 includes the verification result requesting unit 125 for requesting a report of the verification result of the client apparatus 200. Hence, the device verification apparatus 100 can receive the verification result from the client apparatus 200 at arbitary timing.

Furthermore, the verification result requesting unit 125 may receive a request from the external device, and request the client apparatus to report the verification result. Hence, it is possible to receive the verification result according to the request from the external device.

Second Embodiment

Figure 7:
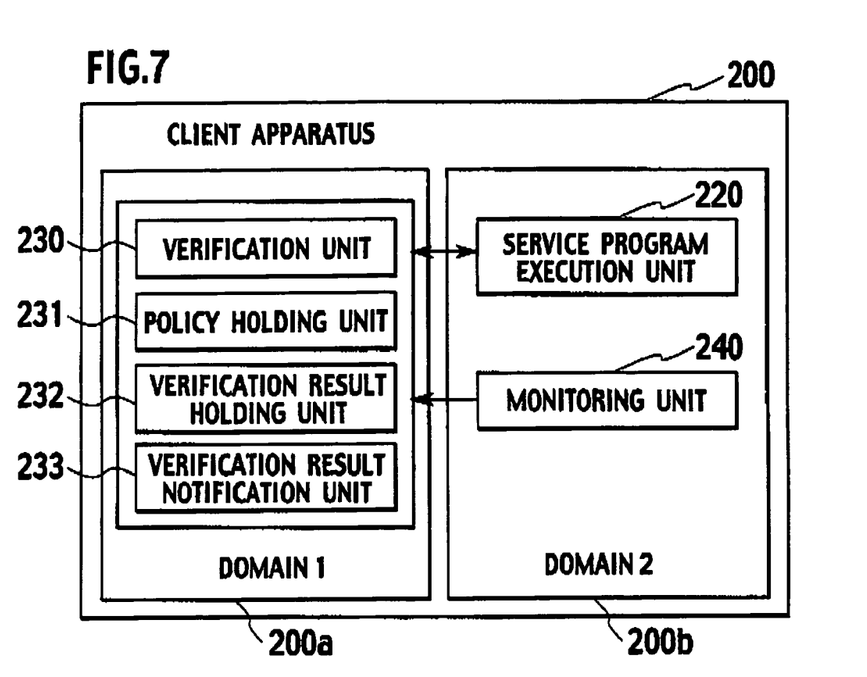
FIG. 7 is a block diagram showing a configuration of a verification system according to a second embodiment.

In the second embodiment, the client apparatus 200 includes the service program execution unit 220 and the monitoring unit 240 in an environment (domain 2) isolated from an environment (domain 1), which is the verification unit 230 deployed in.

(Verification System)

As shown in FIG. 7, according to the second embodiment, the client apparatus 200 includes the verification unit 230, the policy holding unit 231, the verification result holding unit 232, and the verification result holding unit 233 in the environment (domain 1), the service program execution unit 220 and the monitoring unit 240 in the other environment (domain 2) isolated from domain 1.

The second embodiment is similar to the first embodiment except for that the verification unit 230 verifies actions of the service program, and thus explanation of components will be omitted.

(Verification Method)

The verification method of the second embodiment is similar to the first embodiment except for that the verification unit 230 verifies actions of the service program, and thus explanation of components will be omitted.

Figure 8:
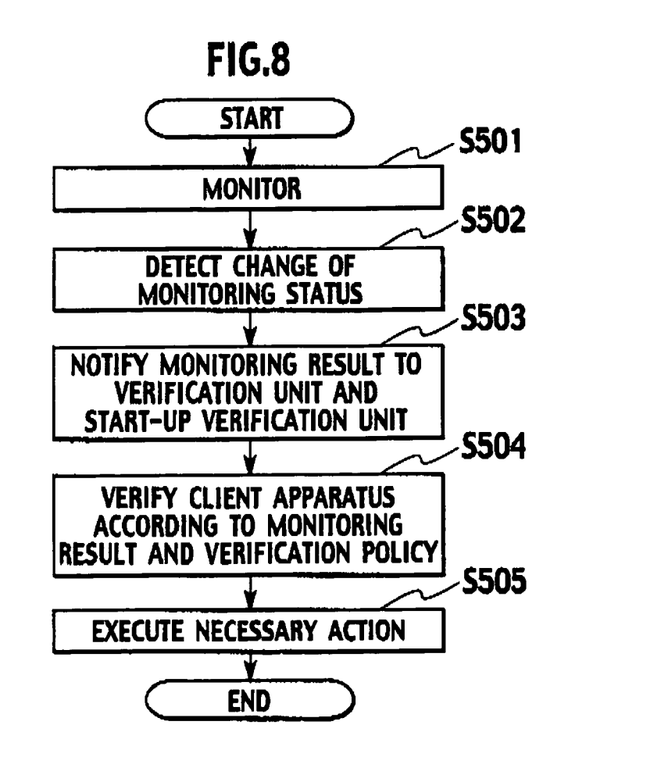
FIG. 8 is a flowchart showing a verification method according to the second embodiment.

As shown in FIG. 8, the monitoring unit 240, in the S501, monitors an operation and configuration information of the client apparatus 200. In the S502, if the monitoring unit 240 detects change of the monitoring stats, the monitoring unit 240 notifies monitoring information to the verification unit 230. For example, it monitors a start/end of the service program, an active (active window state) or inactive (execution in sleep or background) state, a type or a state (connection or disconnection) of a connected network, a type or a state of a connected external device, a state of integrity of a file, and the like.

And in the S503, the monitoring unit 240 notifies the monitoring result to the verification unit 230 and starts-up verification unit 230.

In the S504, the verification unit 230 verifies client apparatus according to the monitoring result and verification policy. And in the S505, the verification unit 230 executes necessary action, for example, logging, or calling the function of the client apparatus 200 such as access control.

As a modified embodiment, the verification unit 230 may request a monitoring result to the monitoring unit 240, and receive the monitoring result.

(Operations and Effects)

According to the second embodiment, the monitoring unit 240 and the service program execution unit 220 is deployed in the isolated environment. Hence, as compared with the first embodiment, the protection of the verification unit 230, or access control function and charging function of the client apparatus 200 can be improved. In other words, verification or the other function of the client apparatus 200 can be executed safely without being influenced by attacks and failure in isolated environment.

Third Embodiment

Figure 9:
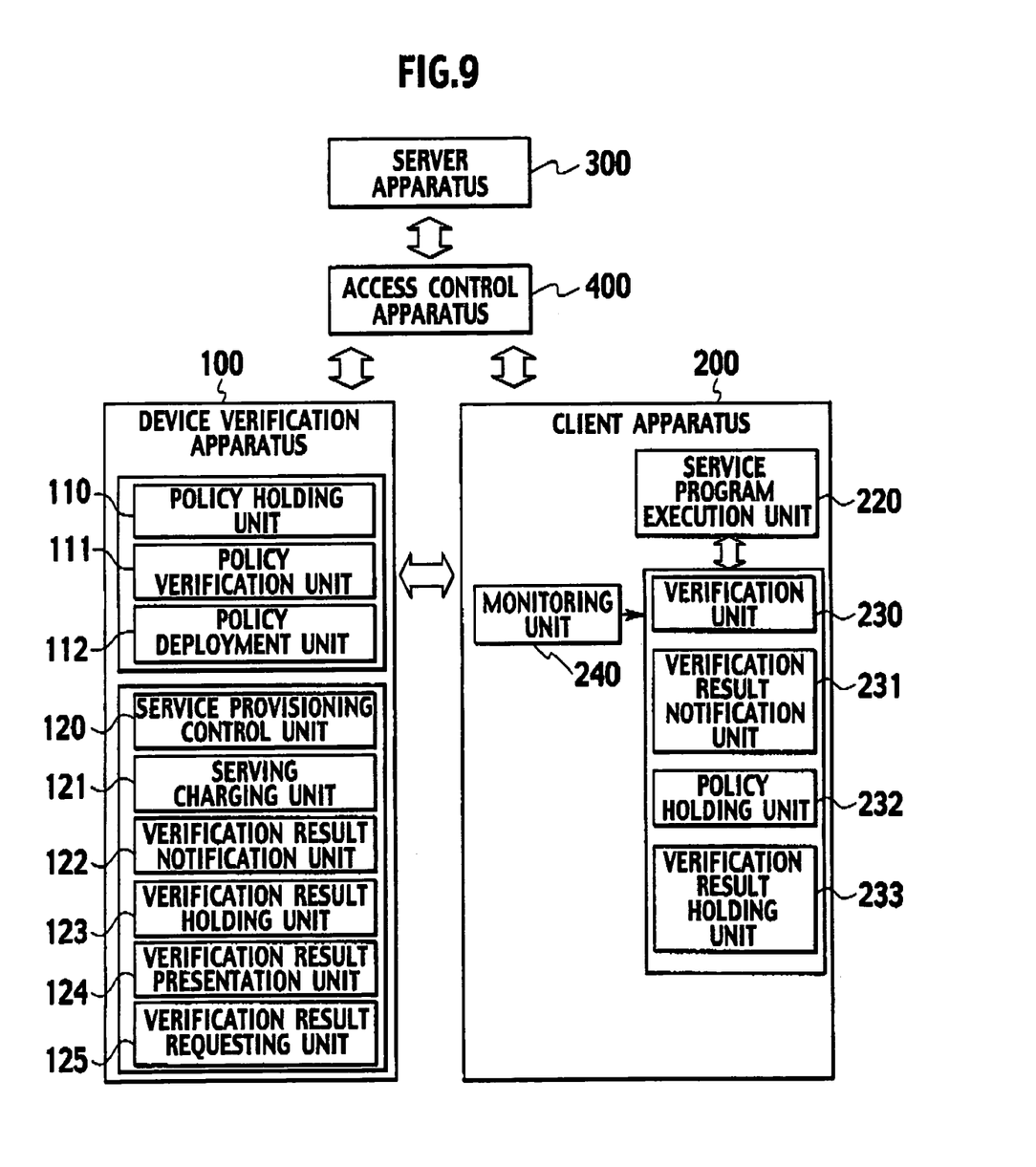
FIG. 9 is a block diagram showing a configuration of a verification system according to a third embodiment.

According to the first embodiment, the device verification apparatus 100 receives an access request and transfers only a permitted access request based the verification result, to the server apparatus 300. According to a third embodiment, however, a access control apparatus 400 is deployed between the client apparatus 200 and the service apparatus 300. The access control apparatus 400 receives an access request from the client apparatus.

(Verification System)

As shown in FIG. 9, the verification system of the third embodiment includes the device verification apparatus 100, the client apparatus 200, the server apparatus 300, and the access control apparatus.

The third embodiment is similar to the first embodiment except for that the access control apparatus 400 receives an access request from the client apparatus 200 to the server apparatus 300, the access control apparatus 400 requests a verification about necessary service to the devise verification apparatus 100, and the access control apparatus 400 controls an access to the server apparatus 300. And thus explanation of components will be omitted.

(Operations and Effects)

According to the verification system of the third embodiment, it is possible to perform flexible configuration as plural access control apparatus and scatter loads by separating access function into the access control apparatus 400.

Forth Embodiment

Figure 10:
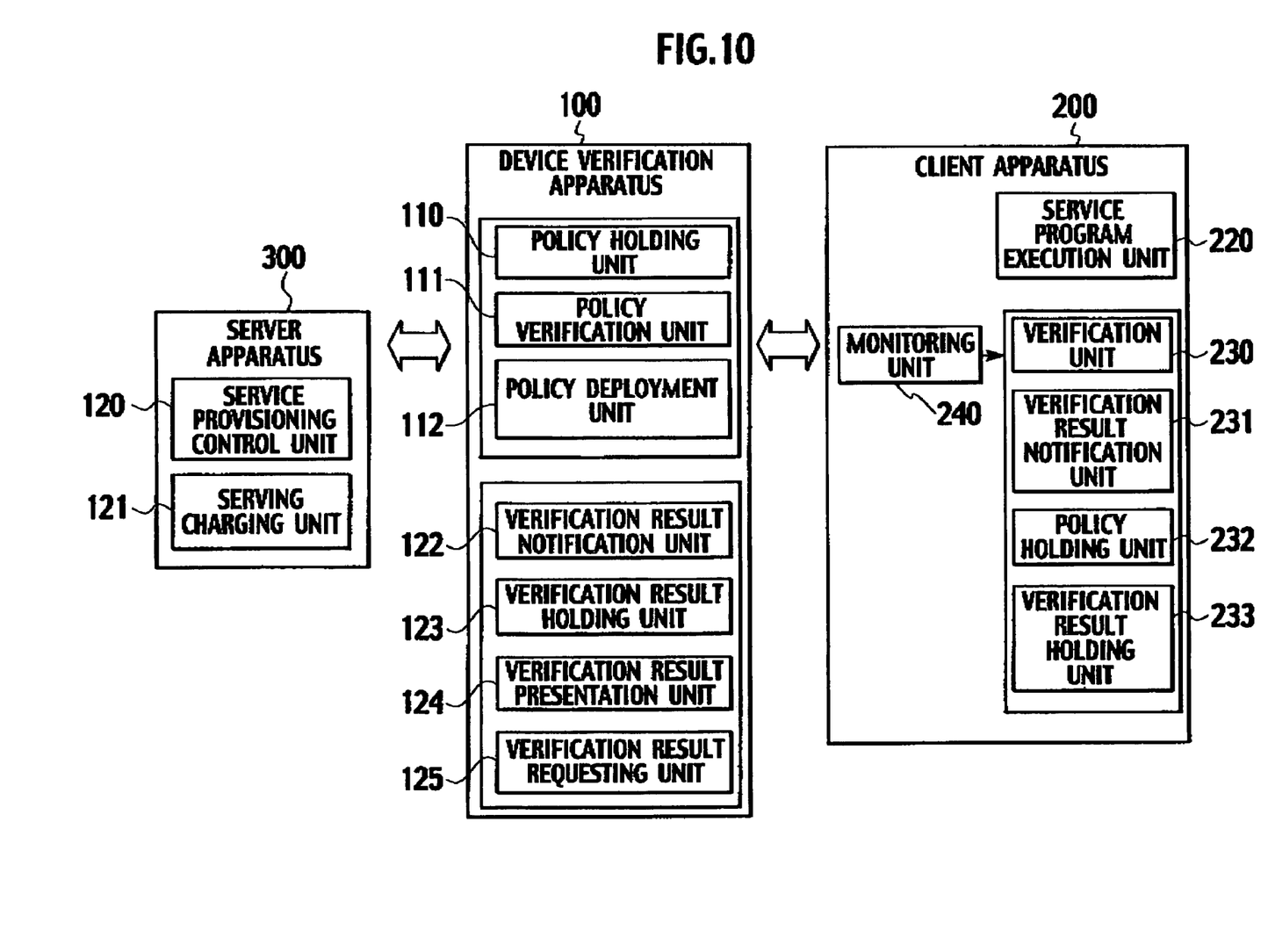
FIG. 10 is a block diagram showing a configuration of a verification system according to a forth embodiment.

According to the first embodiment, the device verification apparatus 100 decides permission of service provisioning and executes charging based on the verification result. According to a forth embodiment, however, a service apparatus 300 (service provider) performs such processing.

(Verification System)

As shown in FIG. 10, a verification system of a second embodiment includes a device verification apparatus 100, a client apparatus 200, and a server apparatus 300.

The second embodiment is similar to the first embodiment except for deployment of the service provisioning control unit 120 and the service charging unit 121 deployed in the device verification unit 100 according to the first embodiment in the server apparatus 300, and thus explanation of components will be omitted.

(Verification Method)

Figure 11:
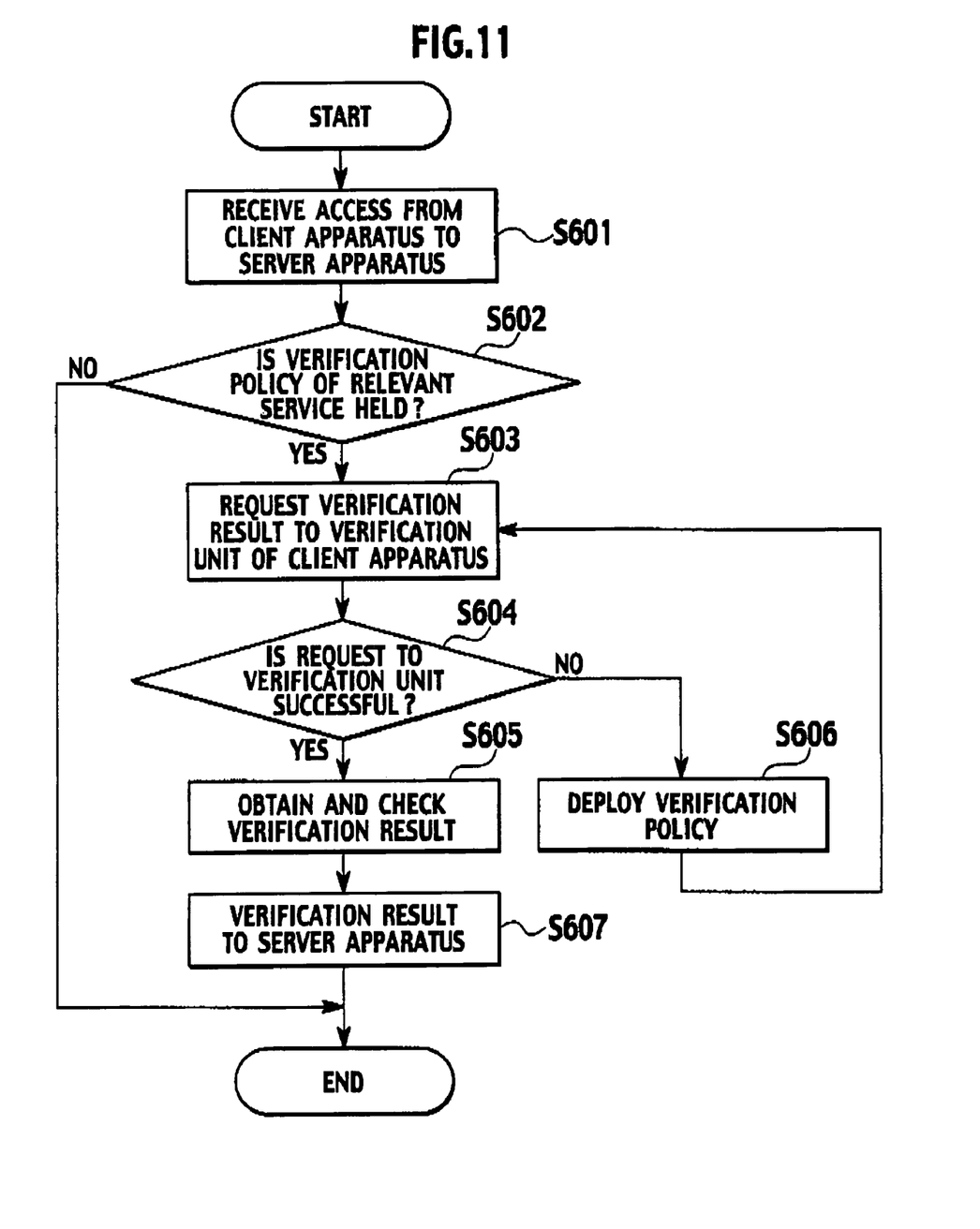
FIG. 11 is a flowchart showing a verification method according to the forth embodiment.

Next, referring to FIG. 11, a verification method according to the second embodiment will be described. Referring to FIG. 11, a method for notifying a verification result when the device verification apparatus 100 receives access from the client apparatus to the server apparatus 300 will be described.

First, upon reception of access from the client apparatus 200 to the server apparatus 300 in step S601, in step S602, the policy holding unit 110 judges holding of a verification policy corresponding to the service program. If the policy is not held, the process judges a service, which needs no verification to permit the access.

If the verification policy is held, the process proceeds to step S603 where the service provisioning control unit 120 requests a notification of a verification result to the verification unit 230 of the client apparatus 200.

At this time, if the request of the notification of the verification request fails in step S604, incorrect deployment of the verification policy in the client apparatus 200 is judged in step S606 to deploy the verification policy. On the other hand, if a response of the verification result is obtained, in step S605, a digital signature of the verification result is checked, and the verification result is interpreted.

Next, in step S607, the verification result notification unit 122 notifies the verification result to the server apparatus 300. The server apparatus 300 decides permission of service provisioning or executes charging by using the verification result.

(Operations and Effects)

According to the forth embodiment, the server apparatus 300 decides permission of service provisioning or executes charging. Hence, as compared with the first embodiment, a processing load of the device verification apparatus 100 can be reduced more.

Fifth Embodiment

Figure 12:
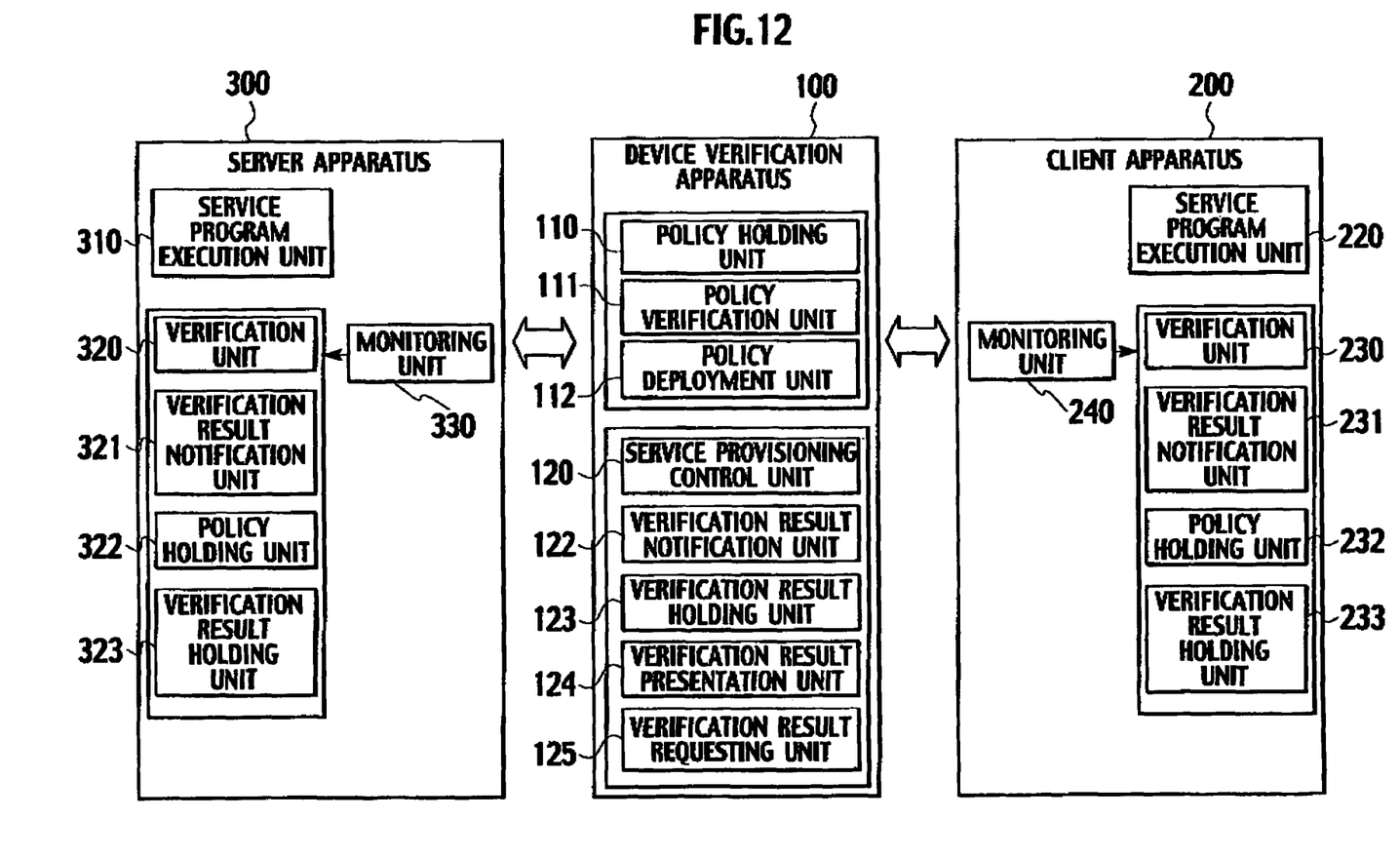
FIG. 12 is a block diagram showing a configuration of a verification system according to a fifth embodiment.

According to a fifth embodiment, a device verification apparatus 100 verifies not only an operation of a client apparatus 200 but also an operation of a server apparatus 300.

(Verification Apparatus)

Referring to FIG. 12, a verification system of the fifth embodiment includes a device verification apparatus 100, a client apparatus 200, and a server apparatus 300. Configurations of the device verification apparatus 100 and the client apparatus 200 are similar to those of the first embodiment, and thus description thereof will be omitted.

The server apparatus 300 includes a service program holding unit 310, a verification unit 320, a verification result notification unit 321, a policy holding unit 232, and a verification result holding unit 323.

The service program holding unit 310 holds a service program.

The verification unit 320 checks the service program based on a verification policy held by the policy holding unit 232.

The verification result notification unit 321 notifies a verification result to the device verification apparatus 100.

The policy holding unit 322 holds the verification policy.

The verification result holding unit 323 holds the verification result of the verification unit 320.

In other words, the verification unit 320, the verification result notification unit 321, the policy holding unit 322, and the verification result holding unit 323 of the server apparatus 300 have functions similar to those of the verification unit 230, the verification result notification unit 231, the policy holding unit 232, and the verification result holding unit 233 of the client apparatus 200, respectively.

The device verification apparatus 100 decides permission of access from the client apparatus 200 to the server apparatus 300 or access from the server apparatus 300 to the device verification apparatus 100. In other words, when a verification result of the server apparatus 300 is valid, access is permitted because the server apparatus 300 can be judged to be normal. When not valid, access is rejected because the server apparatus 300 is judged to be abnormal.

For each of the policy holding unit 322 and the verification result holding unit 323, an internal storage device such as an RAM, or an external storage device such as a hard disk or a flexible disk may be used.

The server apparatus 300 of the fifth embodiment can be configured by incorporating the verification unit 320, the verification result notification unit 321, and the like as modules in a CPU. These modules can be realized by executing a program special for using a predetermined programming language in a general-purpose computer such as a personal computer.

The server apparatus 300 may include a program holding unit (not shown, though) for storing a program which causes the CPU to execute verification processing, verification result notification processing, and the like. For example, the program holding unit is a recording medium such as an RAM, an ROM, a hard disk, a flexible disk, a compact disk, an IC chip, or a cassette tape. According to such a recording medium, the program can be easily stored, transported, and sold.

(Operations and Effects)

According to the client apparatus 200, the device verification apparatus 100, the server apparatus 300, and the verification method of the fifth embodiment, the operations of the client apparatus 200 and the server apparatus 300 can be verified, and the operations can be verified more minutely.

Other Embodiments

The present invention has been described according to the foregoing first to second embodiments. However, it should be understood that the description and drawings which partially constitute the present disclosure do not limit this invention. From this disclosure, various alternative embodiments, embodiments and operational technologies will become apparent to those skilled in the art.

For example, according to the foregoing embodiments, the verification result is received to select permission of service provisioning each time the client apparatus 200 accesses the server apparatus 300. However, the device verification apparatus 100 may memorize previous verification time of the client apparatus 200, and verification of access which arrives within given time may be omitted.

Various modifications will become possible for those skilled in the art after receiving the teachings of the present disclosure without departing from the scope thereof.

What is claimed is:

1. A client apparatus for executing a plurality of application programs, the client apparatus comprising:
    a memory configured to hold a plurality of verification policies, wherein each of the plurality of verification policies corresponds to a different one of the plurality of application programs, and a security of each verification policy of the plurality of verification policies has been checked by a device verification apparatus prior to a deployment of the verification policy to the client apparatus;
    a processor configured to verify an operation of the client apparatus by using one of the plurality of verification policies to produce a verification result, when the client apparatus executes one of the plurality of application programs;
    a verification result holding unit configured to hold the verification result of the processor; and
    a verification result notification unit configured to transmit an access request to the device verification apparatus for access to a server apparatus in accordance with the one of the plurality of application programs, to notify the device verification apparatus of the verification result, when the client apparatus receives a request for the verification result from the device verification apparatus, in accordance with the access request, and to access the server apparatus, based on the verification result.

2. The client apparatus of claim 1, wherein the processor is further configured to check the security of one of the plurality of verification policies.

3. The client apparatus of claim 1, wherein the verification result notification unit is further configured to obtain an update of the one of the plurality of verification policies from the device verification apparatus to update the one of the plurality of verification policies.

4. The client apparatus of claim 1, wherein the processor is further configured to verify the operation of the client apparatus when the client apparatus receives the request from the device verification apparatus.

5. The client apparatus of claim 1, further comprising:
    a monitoring unit configured to monitor the operation and configuration information of the client apparatus and to notify monitoring information to the processor.

6. The client apparatus of claim 1, wherein the verification result notification unit is further configured to notify the verification result to the device verification apparatus at a timing designated by the one of the plurality of verification policies.

7. The client apparatus of claim 1, wherein, the one of the plurality of verification policies contains a command of calling a function of the client apparatus, and the processor is further configured to call the function according to the verification result.

8. A device verification apparatus, comprising:
    a memory configured to hold a plurality of verification policies, each of the plurality of verification policies corresponding to a different application program of a plurality of application programs;
    a processor configured to check a security of the plurality of verification policies and to permit a client apparatus to access to a server apparatus, when the processor confirms that there is no violation of one of the plurality of verification policies in a verification result obtained from the client apparatus;
    a policy deployment unit configured to deploy the one of the plurality of verification policies previously checked by the processor to the client apparatus, according to a request of the client apparatus, and to deploy the one of the plurality of verification policies, which has been confirmed by the processor as safe, to the client apparatus, when the verification result is not obtained from the client apparatus;
    a verification result requesting unit configured to request the verification result from the client apparatus, in accordance with an access request from the client apparatus for access to the server apparatus in accordance with the one of the plurality of application programs; and
    a verification result holding unit configured to hold the verification result obtained from the client apparatus, the client apparatus checking its own operation by using the one of the plurality of verification policies to produce the verification result when the client apparatus executes the one of the plurality of application programs.

9. The device verification apparatus of claim 8, wherein the memory is configured to obtain an updated verification policy from the server apparatus to update the one of the plurality of verification policies.

10. The device verification apparatus of claim 8, wherein the verification result requesting unit is further configured to request the client apparatus to report the verification result upon a reception by the device verification apparatus of a request from an external device.

11. A verification method, implemented by a device verification apparatus, for verifying a client apparatus for executing a plurality of application programs, the verification method comprising:
    checking, with a processor of the device verification apparatus, a security of a plurality of verification policies, each of the plurality of verification policies corresponding to a different one of the plurality of application programs;

receiving an access request from the client apparatus for access to a server apparatus in accordance with one of the plurality of application programs;

deploying, with a policy deployment unit of the device verification apparatus, one of the plurality of verification policies previously checked by the checking to the client apparatus, according to the access request of the client apparatus;

requesting, with the device verification apparatus, a verification result from the client apparatus, in accordance with the access request;

obtaining and storing, in a storage device of the device verification apparatus, the verification result of the client apparatus having checked an operation of the client apparatus by using the one of the plurality of verification policies when the client apparatus executes the one of the plurality of application programs;

permitting, with the processor of the device verification apparatus, the client apparatus to access to the server apparatus, when the processor has confirmed that there is no violation of the one of the plurality of verification policies in the verification result obtained from the client apparatus; and deploying, with the policy deployment unit of the device verification apparatus, the one of the plurality of verification policies, which has been confirmed by the processor as safe, to the client apparatus, when the verification result is not obtained from the client apparatus.

12. A verification method for verifying a client apparatus for executing a plurality of application programs, the verification method implemented by the client apparatus and comprising:

storing, in a memory device of the client apparatus, a plurality of verification policies each corresponding to a different one of the plurality of application programs, each of the plurality of verification policies having been previously checked by a device verification apparatus;

checking, with a processor of the client apparatus, an operation of the client apparatus using one of the plurality of verification policies to produce a verification result, when one of the plurality of application programs is executed by the client apparatus;

transmitting an access request to the device verification apparatus for access to a server apparatus in accordance with the one of the plurality of application programs;

notifying, with a verification result notification unit of the client apparatus, the device verification apparatus of the verification result, when the client apparatus receives a request for the verification result from the device verification apparatus, in accordance with the access request; and accessing, with the verification result notification unit of the client apparatus, the server apparatus, based on the verification result.

* * * * *